March 30, 1926. 1,578,301
E. T. WALKER
BRAKE BEAM SUPPORT AND SAFETY DEVICE
Filed Sept. 12, 1924  2 Sheets-Sheet 1
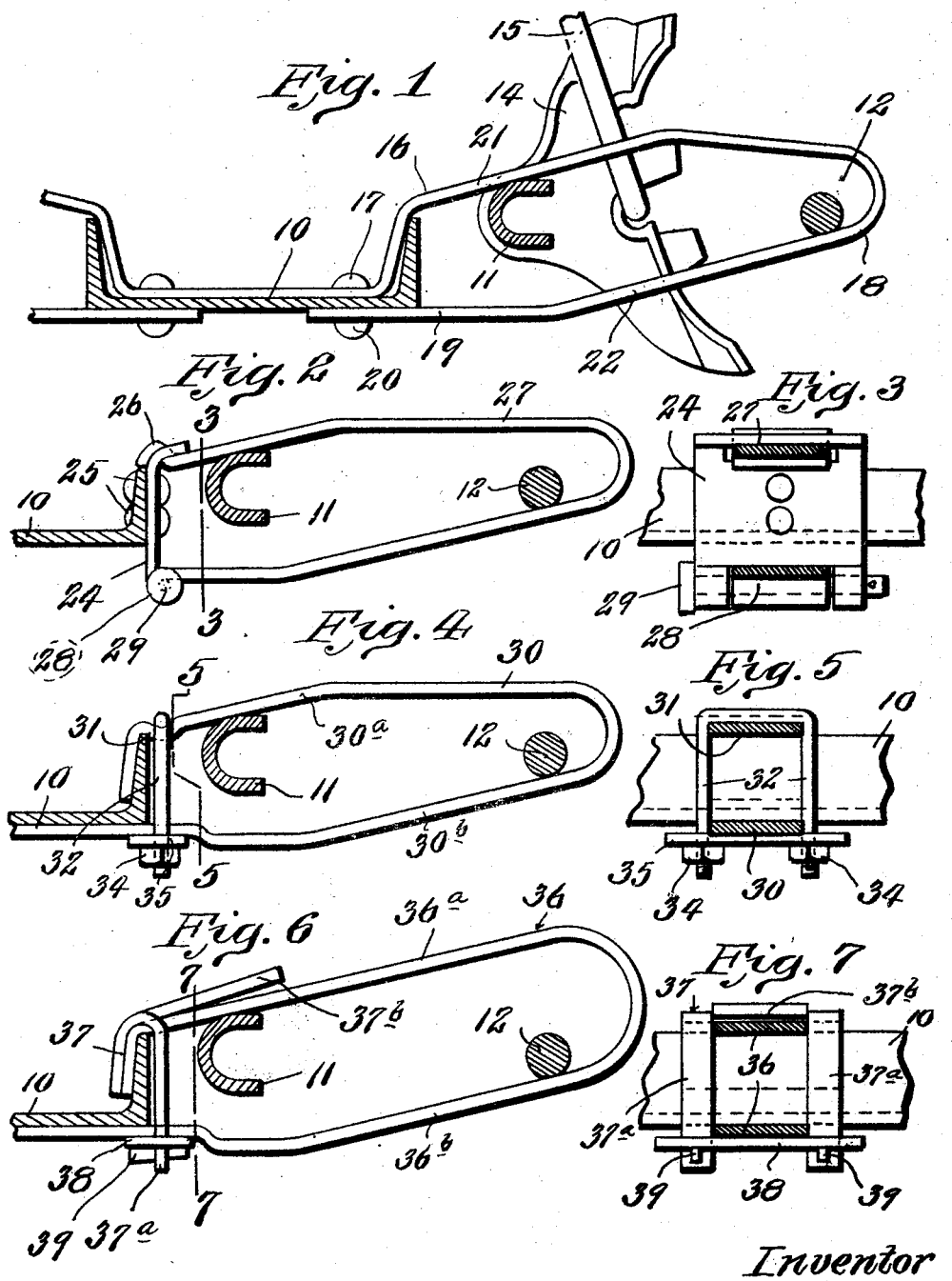
Inventor
Edward T. Walker
By Cornwall, Brdell & Janus
Attys.

March 30, 1926. 1,578,301
E. T. WALKER
BRAKE BEAM SUPPORT AND SAFETY DEVICE
Filed Sept. 12, 1924 2 Sheets-Sheet 2
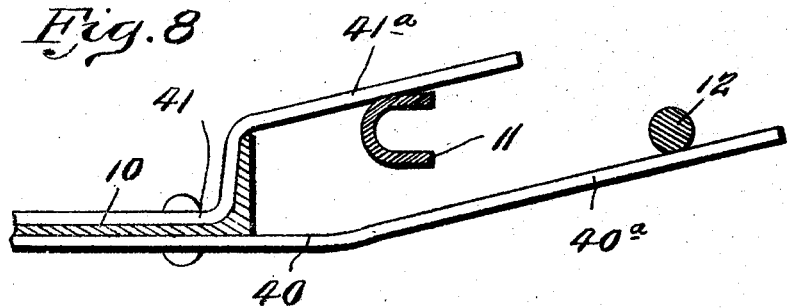
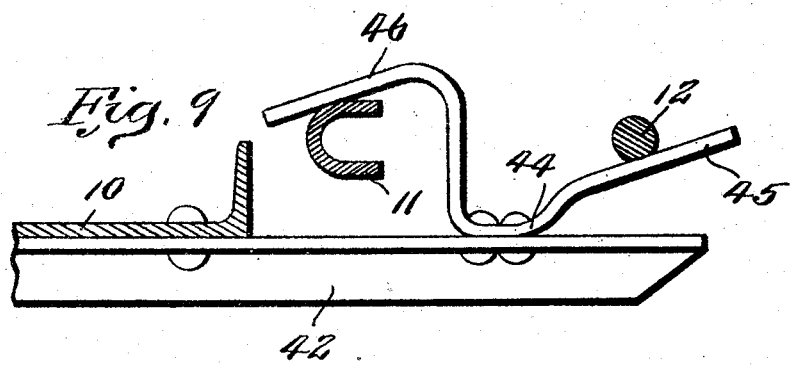
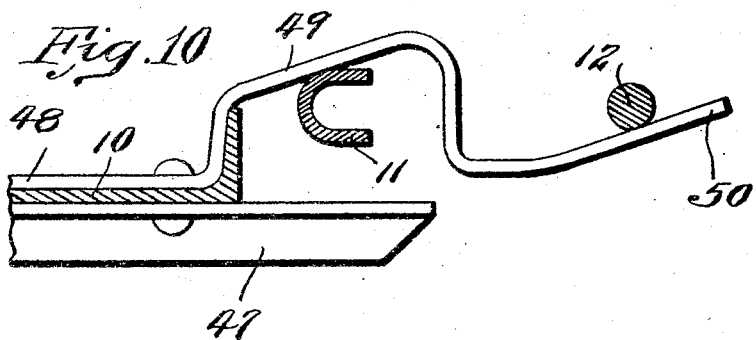
Inventor
Edward T. Walker
By Cornwall, Bidell & Jamis
Attys.

Patented Mar. 30, 1926.

1,578,301

UNITED STATES PATENT OFFICE.

EDWARD T. WALKER, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM SUPPORT AND SAFETY DEVICE.

Application filed September 12, 1924. Serial No. 737,252.

*To all whom it may concern:*

Be it known that I, EDWARD T. WALKER, a citizen of the United States, residing at Chicago, Illinois, have invented a certain new and useful Improvement in Brake-Beam Supports and Safety Devices, of which the following is a specification, such as will enable others skilled in the art to which it appertains to make and use the same.

This invention relates to new and useful improvements in brake beam safety supports and safety devices, and the objects of the invention are to provide a device which is adapted to engage the opposite sides of the ends of a brake beam and guide the latter in its operative movements and prevent the tilting of the brake beam, thereby maintaining the brake shoes in proper alignment with the treads of the car wheels.

Further objects of the invention are to provide a safety support and guide for brake beams having a plurality of inclined track portions disposed above and below the respective ends of the brake beam and in sliding engagement therewith, whereby said brake beam is caused to maintain its predetermined position relative to its path of movement.

Still further objects of the invention are to provide a safety device and guide for trussed brake beams having an upwardly inclined portion extending under the tension member thereof and forming a support and guide therefor and having an upwardly inclined portion disposed above and in sliding engagement with the brake beam compression member for preventing the undue upward movement of said compression member.

With these and other objects in view, my invention consists in certain novel features of construction and arrangement of parts, hereinafter more fully described and claimed, and illustrated in the accompanying drawings, in which—

Figure 1 is a side elevational view of the preferred form of brake beam support and safety device, and showing the compression and tension members of the brake beam in transverse cross section.

Figure 2 is a side elevational view of a modified form of the support and safety device.

Figure 3 is a transverse cross section taken on lines 3—3 of Figure 2.

Figure 4 is a side elevational view of another form of support and safety device.

Figure 5 is a transverse cross section taken on line 5—5 of Figure 4.

Figure 6 is a side elevational view of a further modified form of support and safety device.

Figure 7 is a transverse cross section taken on line 7—7 of Figure 6.

Figures 8, 9 and 10 are side elevational views of still further modified forms of supports and safety devices.

Heretofore, the safety supports or bars were utilized to engage the underside of the brake beam for guiding it in its movements and no provision has been made to use the safety bar or support for slidably engaging the top of the compression member or the rear end of the brake beam for guiding the brake beam and preventing the tilting thereof.

In the present invention, a safety support is disclosed having a plurality of inclined tracks or portions, one of which extends above and over the compression member or rear end of the brake beam and bears thereagainst so that said end is guided in its movements by said track and the other one of said portions extends under the tension member of the brake beam or the forward end thereof and forms a supporting track therefor for guiding said end of the beam in its movements.

The safety support or bar may be formed either in the shape of a loop encircling the beam and having its ends secured to a part of a car truck, or said safety support may be in the form of a bar secured to and extending from said truck part and provided with inclined portions for slidably engaging the respective ends of the beam.

Referring by numerals to the accompanying drawings, 10 indicates a part of a car truck, such as the spring plank, 11 is a compression member and 12 a tension member of the brake beam. 14 are brake heads supported on said beam and engaged by brake hangers 15 which form a pivotal mounting for said beam. The safety support and guide consists of a bar 16 secured at 17 to the truck part 10 and extending over the beam and being then curved or rebent downwardly as at 18 and passing under the beam and having its end 19 secured to the underside of the truck part by rivets or other fastening devices 20. The upper portion of the loop is provided with an upwardly inclined portion 21 which bears on top of the compression member 11 and guides said end of the brake beam in its operative movements while the lower portion of the loop is provided with an inclined portion 22 which forms a support for the tension member 12 and guides it in its movement.

In Figures 2 and 3 a plate 24 is secured by rivets 25 to the flange or side of the spring plank 10 and detachably seated in an aperture formed in the upper end of said plate is the shouldered end 26 of a looped bar 27 which encircles the brake beam and has its opposite end provided with a tubular formation 28 which is adapted to be locked to the tubular lower end of plate 24 by a removable pin 29.

In the form shown in Figures 4 and 5, bar 30 is secured to the underside of the spring plank and extends therefrom under the beam and turns upwardly and is rebent rearwardly over the beam and its end is bent downwardly to fit against the inner face of the flange or side of the spring plank as shown in Figure 4. A transversely disposed seat or jog 31 is formed in said bar adjacent to said end and said seat is adapted to receive the horizontally disposed portion of an inverted U-shaped member or bolt 32, the ends of which are secured by means of nuts 34 to a plate 35 which lies against and transversely of the lower half of the safety bar. By tightening the nuts 34, the loop or bar is rigidly clamped in position on the spring plank. An upwardly inclined portion 30$^a$ is formed in said bar and bears against the top of the compression member and guides it during the movement of the beam. An upwardly inclined track 30$^b$ is formed in the lower portion of bar 30 and forms a track or support for the tension member of the brake beam.

The form shown in Figures 6 and 7 is similar to the preceding form but instead of providing the upper end of the bar 36 with a rebend, said end overlies the flange of the spring plank and a plate 37 fits over said end and has a portion 37$^b$ extending outwardly over said bar 36 for reinforcing the same. This plate 37 has downwardly extending legs 37$^a$, the ends of which pass through apertures formed in a transverse member 38 and are secured thereagainst by wedges 39 which, when forced in position, draw down on the end of the bar and lock it to the spring plank. The longitudinally disposed portions of said bar are inclined upwardly and forwardly as indicated at 36$^a$ and 36$^b$ and form guides for the compression and tension members, respectively. The portion 37$^b$ which is formed by cutting out legs 37$^a$ is bent outwardly and is disposed above portion 36$^a$ and serves as a reinforcement therefor.

In the preceding forms, the inclined tracks are formed by looping or rebending the bar, thereby completely encircling the beam. In the following forms, the track members are not rebent rearwardly but are left open.

In Figure 8 a track member 40 is secured to the underside of the spring plank and extends under the beam and the extreme portion of said bar is inclined upwardly as indicated at 40$^a$ and forms a track and support for the tension member of the brake beam. A bar 41 is secured to the upper side of the spring plank and is bent upwardly and then outwardly to form an upwardly inclined track 41$^a$ which bears against the top of the compression member and prevents undue upward movement thereof.

In Figure 9 a rigid bar 42 is fixed to the spring plank and extends under the brake beam and secured to said bar is a bar 44, one end of which is bent to extend under the tension member of the brake beam and form an inclined track 45 while the opposite end of said bar is bent upwardly and rearwardly to form a rearwardly and downwardly extending track 46 which engages the top of the compression member and guides the same.

In the form shown in Figure 10, a rigid safety bar 47 is secured to the underside of the spring plank and extends under the compression member of the brake beam for supporting said member in case the brake beam mountings fail and a track member 48 is secured to the upper side of the spring plank and is bent to provide an upwardly inclined track 49 which extends over the compression member of the brake beam and is slidingly engaged thereby and is then bent downwardly and forwardly to form a track 50 for supporting and guiding the tension member of the brake beam.

A support and safety device of my improved construction may be used either as a fourth point support or as a third point support for brake beams.

It will be readily understood that various changes in the construction and arrangements of parts of my device can be made and substituted for those herein shown and described, without departing from the spirit of my invention.

I claim:

1. A safety support and guide for brake beams adapted to be secured to a car truck part and having a plurality of track portions for engaging the opposite sides of the compression and tension members of said beam and guiding the latter in its operative movements.

2. A safety support and guide for brake beams adapted to be secured to a part of a car truck and having two upwardly inclined track portions for engaging, respectively, the top and bottom of the compression and tension members of a brake beam.

3. A safety support and guide for brake beams adapted to be secured to a part of a car truck and having two upwardly inclined resilient track portions adapted to enter into sliding engagement, respectively, with the top and bottom of the compression and tension members of the brake beam.

4. A safety support and guide for brake beams having an upwardly inclined portion disposed above and in engagement with the top of the compression member of said brake beam and a lower inclined portion extending under and in sliding engagement with the tension member of said brake beam.

5. A safety bar and guide for brake beams having upwardly inclined portions adapted to be disposed above and below a brake beam and in sliding engagement therewith at spaced and oppositely disposed points for maintaining said beam and parts associated therewith in proper operative position.

6. In a brake gear for railway cars, the combination of a bar secured to a car truck and carrying a plurality of inclined track portions arranged at different-horizontal planes relative to each other for slidably engaging a brake beam at spaced and oppositely disposed points.

7. In a brake gear for railway cars, the combination of a bar secured to a truck part, a plurality of resilient upwardly inclined track portions on said bar, said track portions being arranged, respectively, above and below the compression and tension members of a brake beam and in sliding engagement therewith for guiding said beam in its movements and holding it against displacement.

8. In a car truck construction, the combination of a plurality of inclined track portions disposed, respectively, above and below the compression and tension members of a brake beam, and means for securing said track portions in position.

9. In a car truck construction, the combination with a part of a car truck, of a plurality of upwardly inclined resilient track portions disposed, respectively, above and below a brake beam and in engagement therewith at spaced and oppositely disposed points, and means for securing said track portions to said truck part.

10. A brake beam guide comprising a bar adapted to be secured to a truck part and having a forwardly and upwardly inclined track portion arranged to be disposed above and in sliding engagement with a part of a brake beam, said track portion being inclined upwardly to permit swinging movement of said brake beam in the arc of a circle.

11. A brake beam guide comprising a bar adapted to be secured to a part of a car truck and having a track portion inclined forwardly and upwardly above the compression member of a trussed brake beam and slidably engaged by same for permitting swinging movement of said brake beam and preventing undue upward movement thereof.

12. A brake beam safety support and guide comprising in combination a bar adapted to be secured to a truck part and extending under the brake beam and a fixed and upwardly inclined portion overlying said beam and in sliding contact therewith for guiding said beam during its swinging movements about a definite axis.

In testimony whereof I hereunto affix my signature this 5th day of September, 1924.

EDWARD T. WALKER.